United States Patent [19]

Honda et al.

[11] Patent Number: 4,618,928
[45] Date of Patent: Oct. 21, 1986

[54] DATA PROCESSING APPARATUS FOR PRODUCING X-RAY IMAGES WITH IMPROVED SIGNAL TO NOISE RATIO

[75] Inventors: Michitaka Honda, Ootawara; Katsuya Kikuchi, Tochigi, both of Japan

[73] Assignee: Tokyo Shibaura Denki Kabushiki Kaisha, Kawasaki, Japan

[21] Appl. No.: 558,100

[22] Filed: Dec. 5, 1983

[30] Foreign Application Priority Data

Dec. 6, 1982 [JP] Japan .................. 57-214294

[51] Int. Cl.$^4$ .................. H04N 5/32; H04N 7/00
[52] U.S. Cl. .................. 364/414; 358/111; 358/166; 358/167; 378/99
[58] Field of Search .............. 364/414, 724; 358/111, 358/166, 167; 378/99

[56] References Cited

U.S. PATENT DOCUMENTS

| 4,281,347 | 7/1981 | Tschannen | 358/166 |
| 4,334,244 | 6/1982 | Chan et al. | 358/166 |
| 4,350,998 | 9/1982 | Verhoeven | 358/111 |
| 4,388,646 | 6/1983 | Strother | 358/160 |
| 4,394,684 | 7/1983 | Verhoeven | 358/111 |
| 4,395,732 | 7/1983 | Upton | 358/169 |
| 4,396,903 | 8/1983 | Habicht et al. | 382/9 |
| 4,456,926 | 6/1984 | Kruger et al. | 378/99 X |
| 4,463,375 | 7/1984 | Macovski | 364/414 X |
| 4,472,733 | 9/1984 | Bolger | 358/38 |
| 4,507,681 | 3/1985 | Verhoeven et al. | 358/111 |
| 4,513,440 | 4/1985 | Delman | 382/30 |
| 4,542,459 | 9/1985 | Rieteser | 364/414 |
| 4,553,042 | 2/1986 | Mahmodi et al. | 358/284 |
| 4,561,022 | 12/1985 | Bayer et al. | 358/167 |
| 4,571,635 | 11/1985 | Batterman et al. | 307/263 |

FOREIGN PATENT DOCUMENTS 2020945 11/1979 United Kingdom .

OTHER PUBLICATIONS

European Patent Office Search Report #113433, published 9/12/82, (Honda et al., applicants).

Primary Examiner—Jerry Smith
Assistant Examiner—Charles B. Meyer
Attorney, Agent, or Firm—Finnegan, Henderson, Farabow, Garrett & Dunner

[57] ABSTRACT

An X-ray image data of a patient into which an X-ray contrast medium is being administered is processed in an X-ray image data processing apparatus so as to obtain the X-ray image data having an improved S/N ratio. The processing apparatus mainly comprises a linear differential filter that is composed of a plurality of multipliers and an adder. The X-ray image data is multiplied by a plurality of differential coefficients, and thereafter the results of these multiplications are summed.

4 Claims, 4 Drawing Figures

DATA PROCESSING APPARATUS FOR PRODUCING X-RAY IMAGES WITH IMPROVED SIGNAL TO NOISE RATIO

BACKGROUND OF THE INVENTION

This invention relates to an apparatus for processing X-ray image data by means of a linear differential filter.

In accordance with a method adopted in a conventional X-ray image data processing apparatus, two X-ray images, e.g., a mask image and a contrast image, of an object such as a patient are subjected to a digital subtraction, and contrast variation between X-ray image data in a digital form, or varied components of contrast of X-ray image data which is obtained by the administration of an X-ray contrast medium into a blood vessel of the patient are extracted, whereby an angiographic image thus obtained is provided as diagnosis data.

However, according to this method, since two X-ray images are merely subjected to the digital subtraction, deterioration of the S/N ratio occurs.

In such a conventional X-ray image data processing apparatus, another method may be adopted. According to this method, a plurality of mask image data is calculated to provide averaged mask image data. Then, a plurality of contrast image data is similarly calculated to provide averaged contrast image data. The thus obtained averaged values of the mask and contrast image data are subjected to the subtraction to provide desired subtraction image data. The subtraction image data obtained by the latter method results in an improved S/N ratio as compared to the former method. However, such an averaging method may result in the loss of specific data on diseased portions of a patient which is necessary for correct diagnosis.

The present invention has been made in consideration of this and is based on the fact that a digital subtraction is essentially to execute differentiation of a plurality of X-ray image data taken at various sampling instants, and to extract the pixels whose contrast variations are great. An object of the present invention is to provide an X-ray image data processing apparatus which is capable of providing useful diagnosis data with an improved S/N ratio without resulting in the loss of specific data on the diseased portions of the patient which is necessary for correct diagnosis.

SUMMARY OF THE INVENTION

Those objects of the invention may be accomplished by providing an apparatus for processing X-ray image data by means of a linear differential filter comprising image data storage means for storing X-ray image data at a predetermined storage period, which is obtained by sampling at a predetermined time interval an X-ray image data signal having contrast variance with respect to a time lapse, that is derived from X-rays transferred through an object to be examined;

a plurality of multiplying means which has a plurality of differential coefficients different from each other and performs multiplication between the differential coefficients and the sampled and stored X-ray image data;

means for adding the multiplied X-ray image data derived from a plurality of multiplying means, the adding means and the multiplying means constituting a linear differential filter, and system controlling means for controlling a supply of the sampled and stored X-ray image data to a plurality of the multiplying means.

BRIEF DESCRIPTION OF THE DRAWINGS

For a better understanding of these and other objects of the invention, reference is had to the following detailed description of the invention to be read in conjunction with the following drawings, wherein.

DETAILED DESCRIPTION OF THE PREFERRED EMBODIMENTS

Before proceeding with the various types of the preferred embodiments, a fundamental theory employed in the processing apparatus according to the present invention will be now described.

When X-ray image data is considered to be a set of picture elements, i.e., pixels, X-ray image data of a specific pixel on contrast variation with respect to a time lapse, which image data is succeedingly obtained by X-ray-photographing a patient over time, is given as $f(nT)$, where T is a sampling interval of X-ray image data, which interval is a 1-TV field or 1-TV frame time when the X-ray image data processing apparatus employs a video signal system to be described later, and "n" is a sampling number.

Since a digital subtraction in a conventional X-ray image data processing apparatus involves merely subtracting two digital X-ray image data taken at different sampling instants, the signal components are attenuated while the noise components are emphasized, resulting in a low S/N ratio. However, the present invention is accomplished by the following recognition that an essential point of a digital subtraction is to perform a differential calculation for X-ray image data at different sampling instants and extraction of pixels with great contrast variation.

To obtain diagnostic data of a high S/N ratio, according to the principle of the present invention, differential image data at a desirable observation timing point "O" (corresponding to a point $(nT+T/2)$ on the axis of abscissa of FIG. 1) is obtained using at least four X-ray image data obtained by sampling, in accordance with equation (1) below:

$$f'(nT + T/2) = A \sum_{k=-N}^{N+1} C_k \cdot f(nT + k), N \geq 1 \quad (1)$$

where "A" is a gain coefficient, "Ck" is a differential filter coefficient for each X-ray image data obtained by sampling (namely, the differential filter coefficient for each data is different from each other), and "N" is a variable for determining sampling points (calculation according to equation (1) is performed for four sampling points in this embodiment), this "Ck" satisfying relation (2) below:

$$C_k \neq C_j \qquad (2)$$

for $(k \neq j)$, $(k, j = -N, -N+1, \ldots, N+1)$

Figure 1:
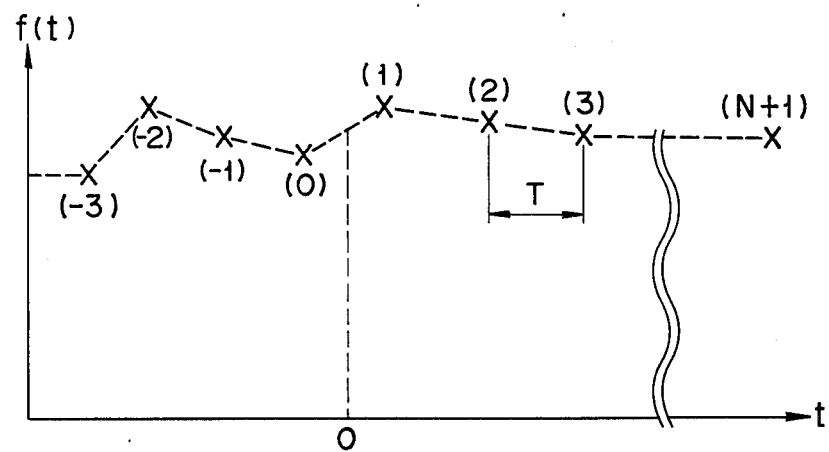
FIG. 1 is a graphic repesentation for explaining a calculation of a differential coefficient according to the present invention.

The meaning of the calculation according to equation (1) above is equal to the calculation of differential image data at a midpoint between sampling points using X-ray image data at a total of four sampling points $-1, 0, 1$ and 2 when $N=1$ in FIG. 1, for example. In other words, X-ray image data (four X-ray image data) taken at two sampling points before and two sampling points taken after the desirable observation timing point "O" are calculated in accordance with equation (1) so as to obtain differential image data at the desirable observation timing point "O", which locates at a midpoint between the two sampling points near to the timing point "O".

The construction and operation of the X-ray image data processing apparatus according to the present invention will be described in detail later. The apparatus of the present invention is mainly embodied by a differential filter 19 consisting of a plurality of memories 13-1 to 13-10, a plurality of multipliers 14-1 to 14-10, and an adder amplifier 15.

The differential filter 19 is a linear type differential filter and has, per se, a known simple configuration. High-precision X-ray image data with an improved S/N ratio can be obtained by an X-ray image data processing apparatus of the present invention, although it mainly consists of a known linear type differential filter having such a simple configuration.

A description will now be made of an X-ray image data processing apparatus which introduces the above-described principle of the present invention and is utilized in an X-ray imaging apparatus with reference to FIG. 2.

Figure 2:
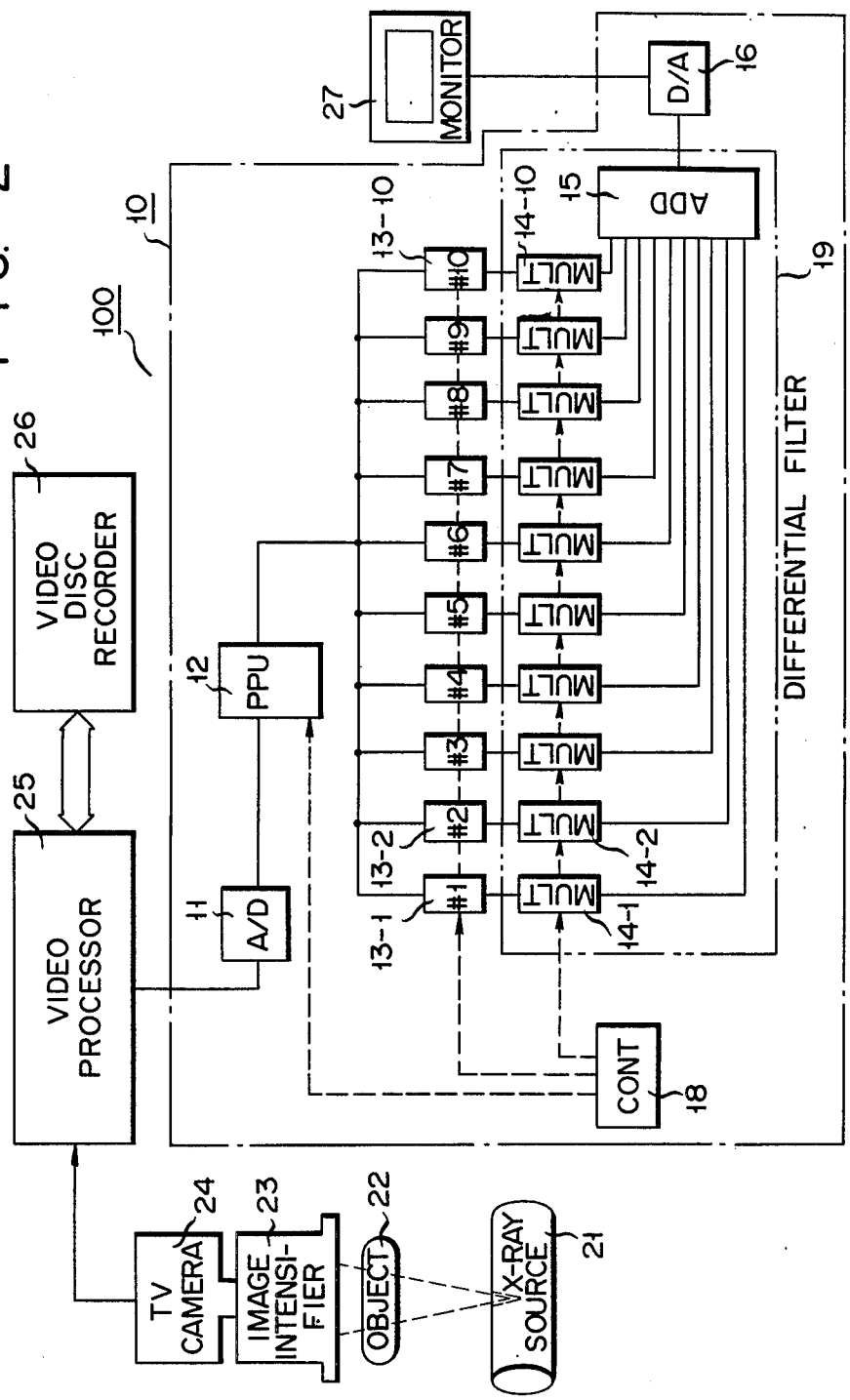
FIG. 2 shows a schematic diagram of an X-ray image data processing apparatus according to the present invention, which is utilized in an X-ray imaging apparatus.

Referring to FIG. 2, an X-ray imaging apparatus 100 has an X-ray source 21 which irradiates X-rays which are projected onto a patient 22. The X-rays transmitted through the patient 22 become incident upon an image intensifier device 23. The incident X-rays are converted into a visible image which is picked up by a television camera 24. The television camera 24 produces a video image signal (referred simply to as a "video signal"). The video signal is supplied to a video processor 25 which performs a known signal processing such as addition of a sync signal (to be supplied to the TV camera 24) or adjustment of a pedestal level. The video signal which has been subjected to such a signal processing is supplied to and is temporarily stored in a video disc recorder 26. The video signal is read out from the video disc recorder 26 as needed so as to perform a predetermined processing at an X-ray image data processing apparatus 100 of the present invention (in this case, the sync pulse is separated out from the video signal before the video signal is supplied to the apparatus 100).

The X-ray image data processing apparatus 100 of the present invention will now be described. An analogue video signal from the video processor 25 is digitized by an A/D converter 11. X-ray image data as the digital signal from the A/D converter 11 is sampled at a predetermined sampling period by a pre-processing unit 12. The X-ray image data sampled by the pre-processing unit 12 is stored every one TV frame (1/30 sec.) in image memories, in this case, 10 chips of a frame memory 13-1, 13-2, . . . , 13-10. Ten multipliers 14-1, 14-2, . . . , 14-10 are provided, and each of these multipliers has a different differential filter coefficient "Ck". Each of the multipliers 14-1, 14-2, . . . , 14-10 multiplies together the corresponding differential filter coefficient "Ck" by a respective datum of X-ray image data #1, #2, . . . , #10. An adder amplifier 15 adds multiplication products from the respective multipliers 14-1, 14-2, . . . , 14-10 and multiplies the obtained sum by a constant, that is, amplifies the sum. A system controller 18 performs switching control for determining which one of the X-ray image data #1, #2, . . . , #10 from the pre-processing unit 12 is stored in which one of the frame memories 13-1, 13-3, . . . , 13-10, and which one of the X-ray image data #1, #2, . . . , #10 stored in the frame memories 13-1, 13-2, . . . , 13-10 is to be supplied to which one of the multipliers 14-1, 14-2, . . . , 14-10. The differential filter 19 consisting of the multipliers 14-1, 14-2, . . . , 14-10 and the adder amplifier 15 performs a calculation in accordance with equation (1). The obtained differential image data is displayed through a D/A converter 16 by an external display device such as a CRT monitor 27.

In general, the number "m" of the frame memories 13-1, 13-2, . . . , 13-m, the number "m" of the multipliers 14-1, 14-2, . . . , 14-m, and the coefficients "Ck" of the differential filter 19 can be determined in the following manner.

EXAMPLE 1

When sampled X-ray image data f(nT) has a maximum frequency $\omega 0$, $\omega 0$ equals to $\pi/T$. In accordance with the frequency theory, equation (1) above can be rewritten as:

$$f'(nT + T/2) = \qquad (3)$$

$$(\omega 0/\pi^2) \sum_{k=-\infty}^{\infty} \{(-1)^{k-1}/(k - \tfrac{1}{2})^2\} \cdot f(nT + kT)$$

Therefore, $CK = (-1)^{k-1}/(k-1/2)^2$

To obtain differential image data $f'(nT+T/2)$ having a sufficient precision which allows correct diagnosis, about 10 X-ray image data are necessary. Accordingly, the above-mentioned number "m" is preferably 10. Thus, in this example, 10 chips of the frame memories and 10 pieces of the multipliers are used.

The calculation according to equation (3) is performed by the 10 frame memories 13-1, 13-2, . . . , 13-10, the 10 multipliers 14-1, 14-2, . . . , 14-10 having the differential filter coefficients "Ck", and the adder amplifier 15 having a gain term $\omega 0/\pi^2$. The S/N ratio of the X-ray image data obtained by the calculation of equation (3) is improved over that of the image data obtained by the conventional subtraction method described above, as will be described hereinafter.

Figure 3:
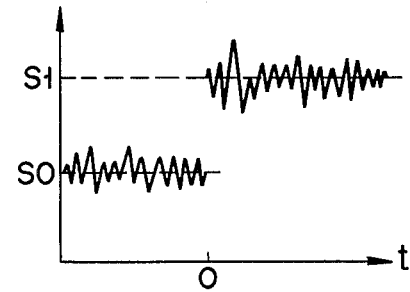
FIG. 3 is a graphic representation for explaining a calculation of S/N ratio.

Referring to FIG. 3, the variation or variance component of a given pixel is given as f(t) given by:

$$f(t) = S0, \sigma^2 \ (t < 0) \qquad (4)$$

$$S1, \sigma^2 \ (t > 0)$$

where S0 and S1 are predicted values of variation data before and after the desirable observation timing point for obtaining differential image data, and $\sigma^2$ is noise power.

The S/N ratio of the differential image data f'(O) at sampling time "O" (see FIG. 1) obtained by the above-explained conventional simple subtraction is given by:

$$(S/N)_{SUB} = (S1 - S0)/\sqrt{2\sigma^2} = (S1 - S0)/1.414\sigma \quad (5)$$

The S/N ratio of the differential image data f'(O) at the sampling time O which is obtained in accordance with equation (3) above is given as follows:

$$\text{Signal ``S''} = (\omega 0/\pi^2) \sum_{k=-6}^{7} \{(-1)^{k-1}/(k-\tfrac{1}{2})^2\} \cdot f(nT + kT)$$
$$= (\omega 0/\pi^2)\{(1/0.5^2 - 1/1.5^2 - 1/2.5^2 - 1/3.5^2 - 1/4.5^2)\}(S1 - S0)$$
$$= (\omega 0/\pi^2) \cdot 3.67 \cdot (S1 - S0)$$

$$\text{Signal ``N''} = (\omega 0/\pi^2)\{(1/0.5^4 + 1/1.5^4 + 1/2.5^4 + 1/3.5^4 + 1/4.5^4)\sigma^2\}^{\frac{1}{2}}$$

$$(S/N)_{EXAM1} = \{3.67(S1 - S0)\}/\sqrt{16.23\sigma^2}$$
$$= (S1 - S0)/1.2\sigma$$

Therefore, we obtain $(S/N)_{EXAM1} > (S/N)_{SUB}$ from equation (5) and the above equations. In Example 1, the S/N ratio of the differential image data is improved by about 20% from that of the differential image data obtained by the conventional subtraction method.

EXAMPLE 2

In Example 1 described above, the X-ray image data f(nT) had a maximum frequency. In Example 2, good differentiation characteristics are obtained in a low frequency range, and an increase in noise upon differentiation is minimized.

In this case, in an X-ray video signal processing system, noise involved in one-frame video data mainly consists of fluctuation noise of X-ray proton and thermal noise emitted from a preamplifier of the TV picktube.

In general, since noise includes high-frequency components, it can be eliminated when the noise is supplied to the differential filter 9. The purpose of the present invention is observation of variation component of the X-ray contrast medium administered in the blood vessel of the patient. In view of this, even if differentiation is performed by a sampling pulse of a high sampling frequency, noise components can be eliminated and simultaneously variation component can be observed without substantial loss in the data of such a variation component.

When the Fourier transform of the differential filter coefficient "Ck" is designated by $C(\omega)$, it is given by:

$$C(\omega) = \sum_{k=-N}^{N} Ck \cdot \sigma^{-j\omega k}$$

If $C(\omega)$ is given as a differentiation characteristic, it is given as:

$$C(\omega) = -j\omega$$

When differetiation is performed in the vicinity of $\omega = 0$, the following equation is obtained:

$$dC(\omega)/d\omega = -j \quad (6)$$

When the noise power of one X-ray image data is defined as "$\sigma^2$", calculation in accordance with the equation (1) yields:

$$\text{Var}[f'(nT + T/2)] = \sum_{k=-N}^{N} |Ck|^2 \cdot \sigma^2$$

where "Var" is the variance.
To minimize noise, a condition below must be satisfied:

$$\text{minimize} \sum_{k=-N}^{N} |Ck|^2 \quad (7)$$

Accordingly, the differential filter coefficient "Ck" satisfying equation (6) and condition (7) is given by:

$$Ck = 3 \sum_{k=-N}^{N} k/\{N \cdot (N+1) \cdot (2N+1)\} \quad (8)$$

When the Ck given by equation (8) above is used as the "Ck" in equation (1), differential image data with a good S/N ratio can be obtained.

Figure 4:
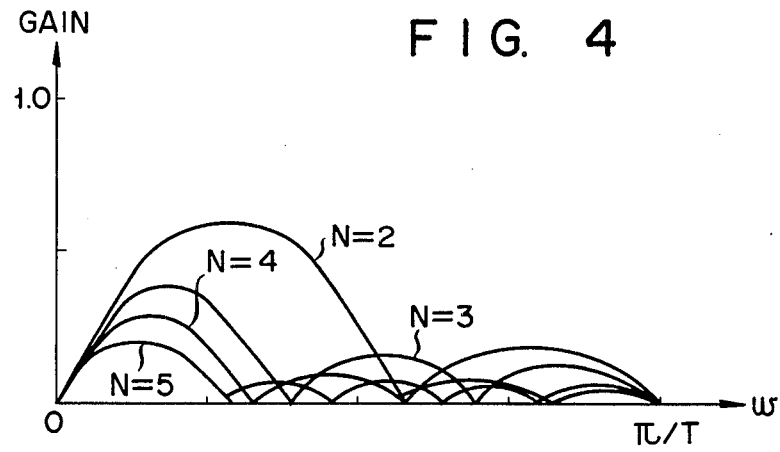
FIG. 4 is a graphic representation for explaining frequency characteristics of the differential filter.

FIG. 4 shows the frequency characteristics obtained in Example 2 using the desirable observation timing point as a parameter. As is seen from FIG. 4, a noise-removal filter is implemented which reduces a high-frequency noise which varies for each sampling and which emphasizes a signal component which changes at long intervals such as variation components of a contrast medium.

An improvement in the S/N ratio by the "Ck" given by equation (8) can be demonstrated as follows.

When $N = 5$, $$\text{Signal ``S''} = 3 \cdot (1/300) \cdot (1 + 2 + 3 + 4 + 5) \cdot (S1 - S0)$$
$$= 0.1363(S1 - S0)$$

$$\text{Noise ``N''} = 3 \cdot (1/300) \cdot [(1^2 + 2^2 + 3^2 + 4^2 + 5^2) \cdot \sigma^2]^{\frac{1}{2}}$$
$$= 0.0674\sigma$$

$$(S/N)_{EXAM2} = 0.1363 \cdot (S1 - S0)/0.067 \cdot \sigma$$
$$= (S1 - S0)/0.5 \cdot \sigma$$

It can be seen from the above results and the result of the equation (5) that $(S/N)_{EXAM2} > (S/N)_{SUB}$. In Example 2, the S/N ratio of the differential image data can be improved by about 280% in comparison with the S/N ratio of the differential image data obtained by the conventional subtraction method.

Although the present invention has been described with reference to a particular preferred embodiment thereof, the present invention is not limited to this. Various changes and modifications may therefore be made within the spirit and scope of the present invention.

For example, when differential image data is obtained over time, the frame memories 13-1, 13-2, . . . , 13-10 as shown in FIG. 2 are sequentially used under the switching control of the system controller 18 such that the latest X-ray image data #n+1 for a given sampling is stored in the frame memory 13-1 which has been storing the earliest X-ray image data #1. For this purpose, the X-ray image data to be supplied to the 10 multipliers 14-1, 14-2, . . . , 14-10 are sequentially shifted as follows, and are added together by the adder amplifier 5. This method is so-termed "Time Internal Difference" imaging.

$$C_{-N}(\#1) + C_{-N+1}(\#2) + \ldots + C_{N+1}(\#10) =$$
differential image data 1

$$C_{-N}(\#2) + C_{-N+1}(\#3) + \ldots + C_{N+1}(\#10 + 1) =$$
differential image data 2

$$C_{-N}(\#k) + C_{-N+1}(\#k+1) + \ldots + C_{N+1}(\#k+N+1) =$$
differential image data $k$ When differentiation of mask image data and contrast image data (the latter changing over time), five frame X-ray image data #1, #2, ..., #5 obtained prior to an interest sampling time for mask image are stored in five frame memories 13-1, 13-2, ..., 13-5 among the 10 frame memories 13-1, 13-2, ..., 13-10. It is waited until the sampling time at which the contrast image is to be obtained. The subsequent X-ray image data #6, #7, ..., #10 are sequentially stored in the remaining five frame memories 13-6 to 13-10. The calculation in accordance with equation (1) is started from the time at which the X-ray image data #10 is stored in the frame memory 13-10 so as to obtain first differential image data. The next contrast image data, i.e., the X-ray image data #11 of the sixth contrast image is stored in the frame memory 13-6. In the differentiation process, the X-ray image data #1, #2, #5 as mask data stored in the five frame memories 13-1, 13-2, ..., 13-5 are supplied to the corresponding multipliers 14-1, 14-2, ..., 14-5. The X-ray image data #11 stored in the frame memory 13-6 is supplied to the multiplier 14-10, the X-ray image data #7 is supplied to the multiplier 14-6, and the X-ray image data #8 stored in the frame memory 13-8 is supplied to the multiplier 14-7. Thus, differentiation is performed to provide second differential image data. In a similar manner, at each sampling instant, the image data of the latest contrast image data is stored in a frame memory which is storing an earliest image data. Differentiation is performed while multipliers are sequentially shifted such that the latest image data is supplied to a frame memory storing an earliest image data. This, differential image data with an improved S/N ratio can be obtained.

Since a main constituent element of the present invention is a differential filter consists of a multiplier and an adder amplifier, the overall apparatus is simple in construction while X-ray image data with a high S/N ratio and high precision can be obtained.

What is claimed is:

1. An apparatus for generating a processed video signal representative of an image of an object over a series of successive observation times, comprising:
   a source of radiation directable at said object;
   means for converting radiation passing through said object into an electric video signal having successive frames;
   means for storing a series of said successive frames of said video signal;
   means for multiplying, for each observation time, each of said successive stored frames by a differential filter coefficient, with the value of said coefficient for each frame being a function of the relationship between the time that frame occurred and said observation times; and
   means for combining said multiplied frames, for each observation time, to produce said processed video signal.

2. An apparatus of claim 1 wherein said processed video signal is represented by $f'(nT+T/2)$ where:

$$f'(nT + T/2) = A \sum_{K=-N}^{N+1} (CK \cdot f(nT + K)), N \geq 1$$

and:

$nT+T/2=$one of said observation times;
$A=$a gain coefficient of said apparatus;
$-N=$the earliest frame sampled for a given observation time; and
$CK=$a differential filter coefficient.

3. An apparatus of claim 2 wherein:

$$CK = (-1)^{K-1}/(K-\tfrac{1}{2})^2.$$

4. An apparatus of claim 2 wherein:

$$CK = 3 \sum_{K=-N}^{N} K/[N \cdot (N+1) \cdot (2N+1)].$$

* * * * *